(12) United States Patent
Malpass et al.

(10) Patent No.: US 12,000,084 B2
(45) Date of Patent: Jun. 4, 2024

(54) SYSTEMS AND METHODS FOR PREPARING DEOXYGENATED DYE COMPOSITIONS

(71) Applicant: INDIGO MILL DESIGNS, INC., Ronda, NC (US)

(72) Inventors: Howard Malpass, China Grove, NC (US); Ralph Tharpe, Ronda, NC (US); M. Dean Ethridge, Lubbock, TX (US); Sudhakar Puvvada, Cary, NC (US); Vince Loy, Reidsville, NC (US)

(73) Assignee: INDIGO MILL DESIGNS, INC., Ronda, NC (US)

( * ) Notice: Subject to any disclaimer, the term of this patent is extended or adjusted under 35 U.S.C. 154(b) by 328 days.

(21) Appl. No.: 17/423,268

(22) PCT Filed: Jan. 16, 2020

(86) PCT No.: PCT/US2020/013770
§ 371 (c)(1),
(2) Date: Jul. 15, 2021

(87) PCT Pub. No.: WO2020/150408
PCT Pub. Date: Jul. 23, 2020

(65) Prior Publication Data
US 2022/0127785 A1     Apr. 28, 2022

Related U.S. Application Data

(60) Provisional application No. 62/793,045, filed on Jan. 16, 2019.

(51) Int. Cl.
*D06P 1/00*     (2006.01)
*C09B 7/00*     (2006.01)
(Continued)

(52) U.S. Cl.
CPC ............... *D06P 1/228* (2013.01); *C09B 7/00* (2013.01); *D06B 19/0094* (2013.01); *D06P 1/965* (2013.01)

(58) Field of Classification Search
CPC . D06P 1/228; D06P 1/965; C09B 7/00; C09B 7/02; D06B 19/0094; D06B 23/205
(Continued)

(56) References Cited

U.S. PATENT DOCUMENTS 4,613,335 A  *  9/1986  Berendt ................. D06P 1/22
                                                          8/918
7,913,524 B2     3/2011  Aurich et al.
(Continued)

FOREIGN PATENT DOCUMENTS

CN         1498923 A  *  5/2004  ............ D09B 67/28
CN       101389801 B  *  8/2013  ............ D06B 19/00
(Continued)

OTHER PUBLICATIONS

International Search Report for PCT/US2020/013770 dated Jun. 2, 2020, 4 pages.
(Continued)

*Primary Examiner* — Eisa B Elhilo
(74) *Attorney, Agent, or Firm* — NIXON & VANDERHYE P.C.

(57) ABSTRACT

Systems and methods are described whereby a deoxygenated liquid dye material is made by supplying the deoxygenated inert gas to a liquid dye material that is susceptible to oxidation, and mixing the liquid dye material in the presence of the supplied deoxygenated inert gas with water and at least one dye formulation component selected from the group consisting of reducing agents, pH adjusters, foaming agents, wetting agents and auxiliary chemicals to form a deoxygenated aqueous dye composition having an oxygen
(Continued)

Figure 1:
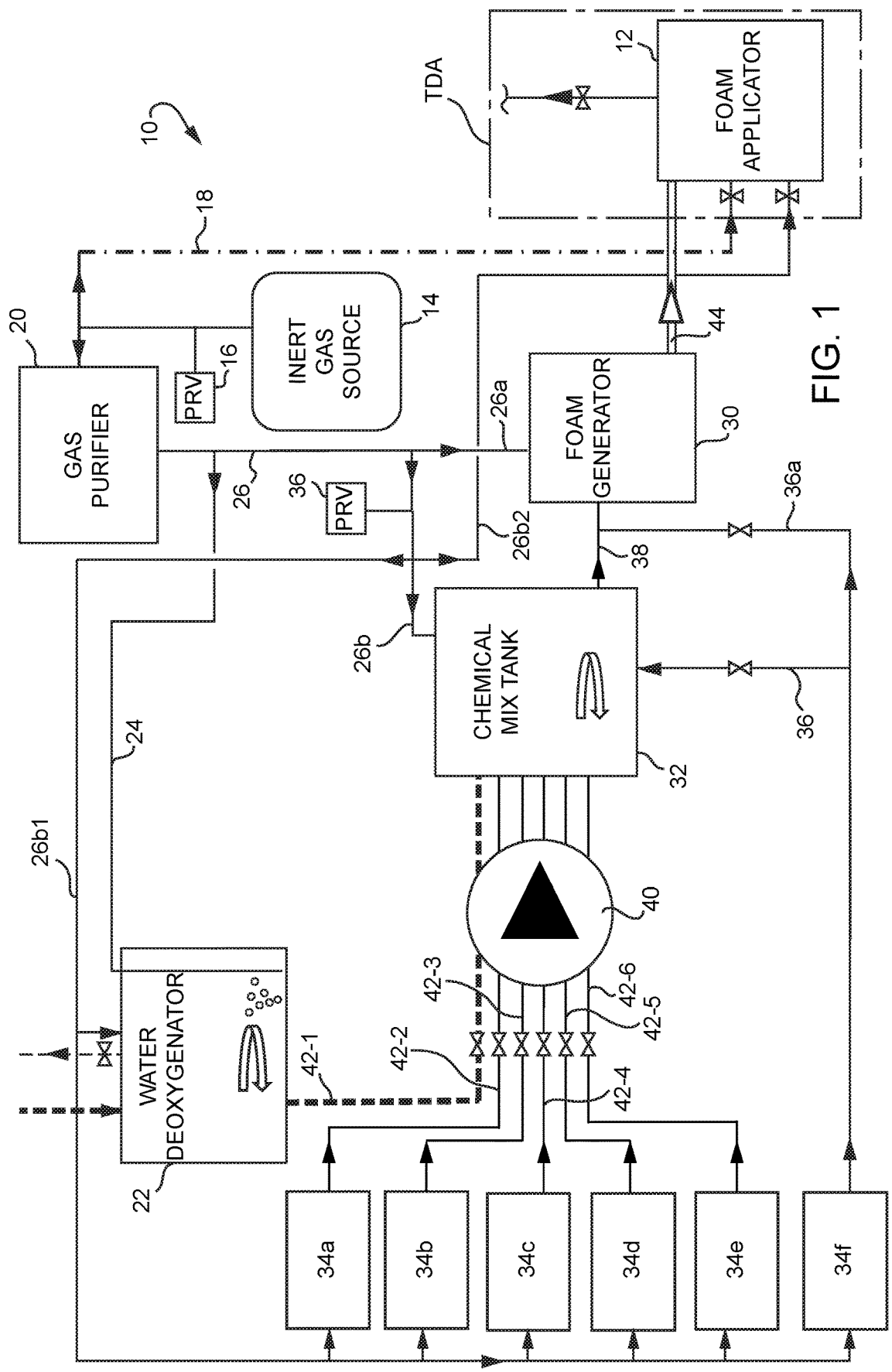

content of 30 ppm oxygen or less. A supply of inert gas may be provided which is then passed to a gas purifier to reduce oxygen content in the inert gas to, e.g., 1 ppb oxygen or less. The deoxygenated aqueous dye composition that is formed may have an oxygen content of 1 ppm or less.

31 Claims, 2 Drawing Sheets

(51) Int. Cl.
  *D06B 19/00* (2006.01)
  *D06P 1/22* (2006.01)
  *D06P 1/96* (2006.01)
(58) Field of Classification Search
  USPC .......................................................... 8/653
  See application file for complete search history.

(56) References Cited

U.S. PATENT DOCUMENTS

| | | |
|---|---|---|
| 8,215,138 B2 | 7/2012 | Ronchi |
| 2018/0073192 A1 | 3/2018 | Malpass et al. |

FOREIGN PATENT DOCUMENTS

| | | | | |
|---|---|---|---|---|
| WO | WO 2008056256 A1 * | 5/2008 | ............. | D06B 19/00 |
| WO | 2010/000551 | 1/2010 | | |
| WO | WO 2010/000551 A2 * | 1/2010 | ......... | D06B 19/0094 |

OTHER PUBLICATIONS

Written Opinion of the ISA for PCT/US2020/013770 dated Jun. 2, 2020, 7 pages.
Zekos et al., "A note on a design protocol for deoxygenation of water", Electrochemistry Communications, 2019, vol. 103, pp. 12-16 (5 total pages).
Wiesler, "Membranes—How to Meet Today's Dissolved Oxygen Specifications with Degasification Membranes", ISSN: 0747-8291, Ultrapure Water®, UP200338, Mar. 2003, 5 total pages.
3M™ Liqui-Cel™, "Membrane Contractors", Technical Brief—Optimized Deaeration System for Paulaner Brewery, Rev. Jan. 2017, 3 total pages.
Coutsicos, "Neue Indgo-faerbetechnoligie", Textil Veredlung, Jul. 1, 2006, vol. 41, No. 7/8, XP001522111, pp. 23-25 (3 total pages).

* cited by examiner

SYSTEMS AND METHODS FOR PREPARING DEOXYGENATED DYE COMPOSITIONS

CROSS-REFERENCE TO RELATED APPLICATION

This application is the U.S. National Phase of International Application No. PCT/US2020/013770 filed Jan. 16, 2020 which designated the U.S. and claims priority benefits from U.S. Provisional Application Ser. No. 62/793,045 filed on Jan. 16, 2019, the entire contents of each of which are expressly incorporated hereinto by reference.

FIELD

The embodiments disclosed herein relate generally to systems and methods whereby a deoxygenated dye composition may be prepared and delivered for use in an anaerobic dyeing process. The thus formed deoxygenated dye compositions may therefore be usefully employed in a low wet pick up foam dyeing of natural and regenerated natural fibers (e.g. by application of a foam or spray onto cotton, wool, rayon and other biopolymers). The systems and methods are especially useful in the preparation of deoxygenated foamed indigo dye compositions for forming indigo dyed yarns and fabrics formed of such indigo dyed yarns (e.g., denim fabrics) which exhibit exceptionally high colorfastness (both wet and dry).

BACKGROUND

Low wet pick-up dyeing of textile materials including the use of anaerobic foam dyeing processing techniques using pre-reduced indigo (PRI) dye compositions have emerged in recent years as a means by which the need for yarn pre-treatment and/or reducing agents can be avoided. By way of example, reference is made to U.S. Pat. No. 7,913,524 to Aurich, U.S. Pat. No. 8,215,138 to Ronchi and US 2018/0073192 to Malpass et al, the entire contents of each being expressly incorporated hereinto by reference.

As can be appreciated, the anaerobic dyeing of textile materials necessarily depends on a dyeing system which is substantially devoid of oxygen during the dyeing process. It is therefore of critical importance that not only oxygen from the ambient atmosphere be precluded from entering the anaerobic dyeing chamber(s), it is also important that any oxygen entrained in the materials that may enter the dyeing chamber(s) be removed to the maximum extent possible. It is therefore towards providing systems and methods whereby an oxygen-free foamed dye composition may be prepared and delivered for use in an anaerobic dyeing process that the embodiments disclosed herein are directed.

SUMMARY

In general, the embodiments disclosed herein are directed toward systems and methods whereby a deoxygenated dye composition may be prepared and delivered for use in an anaerobic dyeing process. The thus formed deoxygenated dye compositions may therefore be usefully employed in a low wet pick up foam dyeing of natural and regenerated natural fibers (e.g. by application of a foam or spray onto cotton, wool, rayon and other biopolymers).

According to certain embodiments, the systems and methods described herein whereby a deoxygenated liquid dye composition is made by supplying the deoxygenated inert gas to a liquid dye material that is susceptible to oxidation, and mixing the liquid dye material in the presence of the supplied deoxygenated inert gas with water and at least one dye formulation component selected from the group consisting of reducing agents, pH adjusters, foaming agents, wetting agents and auxiliary chemicals to form a deoxygenated aqueous dye composition having an oxygen content of 30 ppm oxygen or less. More specifically, a supply of inert gas may be provided which is then passed through a gas purifier to reduce oxygen content in the inert gas to, e.g., 500 ppb oxygen or less. The deoxygenated aqueous dye composition that is formed may therefore have an oxygen content of 1 ppm or less.

Some embodiments will provide a supply of deoxygenated water to the liquid dye material in the presence of the supplied deoxygenated inert gas. In this regard, the deoxygenated inert gas may be supplied to a water deoxygenator so as to deoxygenate water in the water deoxygenator with the supplied inert gas. Alternatively or additionally, the deoxygenated water may be provided by passing a supply of water through a deoxygenation membrane.

At least one container may be provided to contain the at least one dye formulation component. The deoxygenated inert gas may therefore be supplied to the at least one container to maintain the at least one dye formulation component in a substantially oxygen-free environment.

A metered amount of at least one dye formulation component to be mixed with the liquid dye material may be supplied by a peristaltic pump. Specifically, the output of the peristaltic pump may be supplied to a mixing tank wherein the at least one dye formulation component may be mixed with the liquid dye material in the mixing tank to form the deoxygenated aqueous dye composition.

According to certain embodiments, the deoxygenated aqueous dye composition will be supplied to a foam generator for generating a deoxygenated foamed aqueous dye composition. The deoxygenated foamed aqueous dye composition may thus be applied onto a textile product using known textile dyeing apparatus.

These and other aspects and advantages of the present invention will become more clear after careful consideration is given to the following detailed description of the preferred exemplary embodiments thereof.

BRIEF DESCRIPTION OF ACCOMPANYING DRAWINGS

Figure 2:
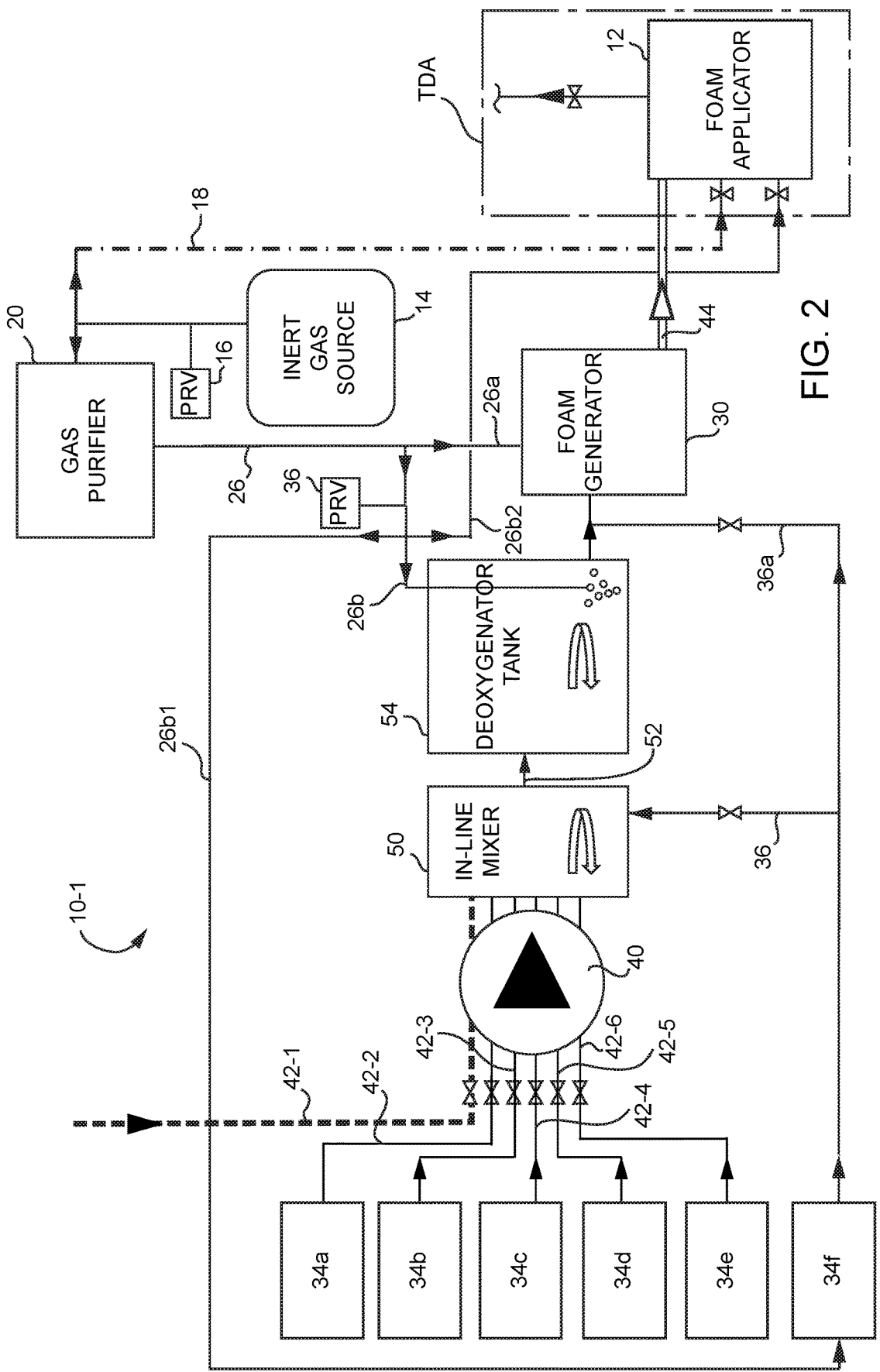

The disclosed embodiments of the present invention will be better and more completely understood by referring to the following detailed description of exemplary non-limiting illustrative embodiments in conjunction with the drawings of which:

FIGS. 1-2 are schematic diagrams showing respective embodiments according to the invention of a system for preparing deoxygenated foamed dye material.

DETAILED DESCRIPTION

A. Definitions

As used herein and in the accompanying claims, the terms below are intended to have the following definitions:

"Filament" means a fibrous strand of extreme or indefinite length.

"Fiber" means a fibrous strand of definite or short length, such as a staple fiber.

"Yarn" means a collection of numerous filaments or fibers which may or may not be textured, spun, twisted or laid together.

"Woven fabric" means a fabric composed of two sets of yarns, warp and filling, and formed by interlacing (weaving) two or more warp yarns and filling yarns in a particular weave pattern (e.g., plain weave, twill weave and satin weave). Thus, during weaving the warp and fill yarns will be interlaced so as to cross each other at right angles to produce the woven fabric having the desired weave pattern.

"Denim fabric" is a woven warp-faced fabric formed of cotton yarns in which the weft yarns pass under two or more warp yarns to form a twill weave which produces a diagonal ribbing, whereby the warp yarns are indigo dyed and the weft yarns are undyed.

"Deoxygenated" refers to a material having a low (or no) amount of oxygen, specifically a material containing 30 ppm or less, preferably 10 ppm or less, and most preferably 1 ppm or less of free oxygen. A deoxygenated material may also be oxygen-free, i.e., the material will contain substantially no (i.e., substantially if not exactly zero ppm) free oxygen.

"Natural fibers" are fibers that are formed in nature, for example, cellulosic fibers, cotton fibers, wool fibers and the like.

"Synthetic fibers" are fibers that are man-made, for example, nylon fibers, polyester fibers, polyolefin fibers and regenerated cellulosic fibers such as rayon.

"Wet pick-up" is the weight percent of liquid indigo dye on the fiber substrate, e.g., yarn or fabric, at the time of indigo dye oxidation.

"Pre-reduced indigo dye" or "PRI dye" is an indigo dye molecule that has been reduced to its leuco form by contact with, e.g., sodium dithionite. Such a reduced indigo dye molecule may then be reconverted to an indigo dye molecule via oxidation (e.g., exposure to an oxygen-containing environment, typically atmospheric air).

"Draves Wetting Time" is meant to be determinative of the wettability of a textile product according to ASTM D2281-68.

B. Description of Preferred Embodiments

Accompanying FIG. 1 schematically depicts a dye preparation system 10 in accordance with an embodiment of the present invention for forming an oxygen-free foamed dye, preferably a foamed PRI dye which may be delivered to a foam applicator 12 associated with an anaerobic textile dyeing apparatus TDA, e.g., such as the apparatus disclosed in the above-referenced US 2018/0073192 to Malpass et al.

As shown, the system 10 includes a source 14 of inert gas, e.g., a tank or canister of liquid or gaseous nitrogen. If liquid nitrogen is used as the inert gas source 14, a pressure relieve valve (PRV) 16 is provided so as to reduce the pressure to e.g., about 100 psi and thereby form gaseous nitrogen. The inert gas source will preferably contain commercially available inert gas (e.g., nitrogen) that is typically supplied with an oxygen content of about 2 ppm. Such low oxygen content inert gas may therefore be delivered directly from the gas source 14 via line 18 to the foam applicator 12 in the TDA as the TDA will typically operate at a free oxygen content of about 30 ppm or less. However, in accordance with the embodiment shown in FIG. 1, the inert gas from source 14 is scrubbed of substantially all free oxygen by a gas purifier 20 so that the discharged inert gas from the purifier 20 will contain an oxygen content of about 500 ppb or less. Any conventional inert gas purification system may be employed in the practice of this invention. For example, the gas purifier may be incorporated in a purification system that includes a membrane, a catalyst, molecular sieve, an absorber, a getter or combinations thereof.

The purified inert gas (e.g., having an oxygen content of about 500 ppb or less) exits the gas purifier 20 and is directed to a water deoxygenator 22 by way of line 24. Inert gas discharge line 26 from the gas purifier 20 includes a branch 26a which directs the oxygen purified inert gas to a foam generator 30, and a branch 26b which directs the oxygen purified inert gas to a chemical mix tank 32. The branch 26b includes sub-branches 26b1 and 26b2 which respectively direct the oxygen purified inert gas to the foam applicator 12 within the TDA and the chemical tanks 34a-34f which contain individual component of the dye composition to be mixed in the chemical mix tank 32. It will be observed that, prior to the sub-branches 26b1 and 26b2, a pressure reducing valve (PRV) 36 is provided so as to further reduce the pressure of the oxygen purified gas in line 26, e.g., to about 0.5 psi.

The water deoxygenator 22 may be any system that is conventionally known to deoxygenate a water supply. In the embodiment depicted, a conventional inert gas bubbler deoxygenator is shown. See in this regard, Zekos et al, *A note on a design protocol for deoxygenation of water*, Electrochemistry Communications 103 (2019) 12-16, the entire content of which is expressly incorporated hereinto by reference. Conventional membrane contactors may be employed to deoxygenate the water supply, such as the commercially available 3M™ LIQUI-CEL™ Membrane Contractors. See also in this regard Wiesler, *Membranes— How to Meet Today's Dissolved Oxygen Specifications with Degasification Membranes*, ISSN:0747-8291, Ultrapure Water®, UP200338, March 2003, the entire content of which is expressly incorporated hereinto by reference. Regardless of the system employed to deoxygenate the water supply, the water deoxygenator 22 will provide deoxygenated water having an oxygen content of about 5 ppm or less, e.g., between about 2 to about 5 ppm. Ideally, the water deoxygenator 22 functions to deoxygenate the water supply to a level of entrained oxygen which is no greater than the inert gas discharged from the gas purifier, for example about 5 ppm or less.

The chemical tanks 34a-34e may contain the individual chemical components that may be used for a specific dye composition to be applied to a textile material in the TDA by way of the foam applicator 12. By way of example, the tank 34a may contain a reducing agent (e.g., in the event that PRI dye is not employed), tank 34b may contain a pH adjuster, tank 34c may contain a foaming agent, tank 34d may contain a wetting agent and tank 34e may contain other auxiliary chemicals typically employed in dye formulations.

Exemplary reducing agents may include small amounts of sodium hydrosulfite (sodium dithionate), thiourea dioxide or sodium borohydride and/or monosaccharides such as glucose, fructose and galactose, disaccharides such as lactose and maltose, thiourea, Sera Con-C RDA from Dystar, zinc, ferrous sulfate, hydroxy-carbonyl compounds (e.g., hydroxyacetone), and the like. The reducing agents are employed in a sufficient quantity so as to reduce the redox potential of the liquid mixture to −700 mV or less.

Exemplary pH adjusters include, for example, alkaline materials, such as metal hydroxides and carbonates, e.g., sodium and potassium hydroxides and carbonates. The pH adjusters are employed in an amount sufficient to provide an alkaline pH to the liquid mixture of between about 10.5 to about 12.5.

Exemplary foaming agents include, for example, surfactants that when added to the dye composition can produce foam. Suitable foaming agents therefore include nonionic, anionic, cationic and zwitterionic surfactants.

Exemplary wetting agents include, for example, lauryl glucoside (Draves Wetting time of about 12 secs), cocoglucoside (Draves Wetting time of about 5 secs), decyl glucoside (Draves Wetting time of about 4.5 secs), caprylyl/capryl glucoside (Draves Wetting time of about 2 secs). Other suitable wetting agents could include other nonionic, anionic, cationic and zwitterionic wetting agents such as amine oxides, sulfosuccinates, sulfonates, phosphates, ethoxylates etc. The wetting agents employed in the practice of this invention are preferred to have a Draves Wetting time less than about 40 secs, preferably less than about 20 secs. As used herein, a "wetting agent" is a surfactant that, when dissolved in water, lowers the advancing contact angle and aids in displacing an air phase at the surface, which is replaced with a liquid phase. The same material may function both as a foaming agent and a wetting agent.

Exemplary auxiliary chemicals include, for example, any compound that is used conventionally in the dyeing of textile materials so as to achieve desired properties of the liquid dye mixture. Auxiliary chemicals, may therefore be water conditioners, viscosity modifiers, polymers and/or any other functional additives. In addition, machine cleaning chemicals may also be used to maintain the process equipment.

Tank 34f may contain a dye material, for example a PRI dye or a pre-reduced sulfur dye. The tank 34f may also constitute several tanks which provide different dye materials having different color chromas/hues and/or dye uptake properties as may be desired. The dye material(s) from tank 34f may be introduced into the chemical mix tank via line 36. Alternatively, the dye material(s) from tank 34f may be introduced directly into the discharge line 38 from the chemical mix tank 32 via line 36a and then directed to the foam generator 30.

The individual chemical components from the supply tanks 34a-34e as may be needed in the TDA along with the deoxygenated water from the water deoxygenator 22 are controllably metered in the desired quantities into the chemical mix tank 32 by means of a fluid-isolated pump system 40. The pump system 40 may, for example, be any conventional positive displacement pump whereby the pumping mechanisms do not directly contact the fluid being pumped. In this regard, one or more controlled metering peristaltic tube pumps may be employed. For example, an individual peristaltic tube pump may be provided for each of the lines 42-1 through 42-6 so as to controllably meter the desired quantities of deoxygenated water from the water deoxygenator 22 and each of the chemical supply tanks 34a-34e, respectively, as may be required. Alternatively, a multi-tube peristaltic pump having individually controllable tube channels may be employed for the pump system 40. Such controllable metering peristaltic tube pumps are well known to those skilled in this art from a number of commercial sources, for example the peristaltic tube pumps from Watson-Marlow Fluid Technology Group.

The chemical components, deoxygenated water and optionally the dye material(s) are mixed within the chemical mix tank 32, preferably under gentle agitation, so as to provide a liquid dye mixture that is discharged to the foam generator 30. In the system depicted in FIG. 1, the chemical mix tank 32 may be embodied in an agitated batch mix tank. However, the chemical mix tank 32 may alternatively be embodied in an in-line mixer (either static or dynamic mixer) in case the system 10 may be operated on a continuous basis.

The foam generator 30 may be of any conventional foam generation system that is capable of creating a foam from the liquid dye mixture formed in the chemical mix tank using the oxygen purified inert gas supplied from the gas purifier 20 via line 26a such that the dye material is dispersed throughout the foam. By way of example, the foam generator 30 may be the CFS® System that is commercially available from Gaston Systems, Inc. of Stanley, NC.

The oxygen free foamed dye material discharged from the flam generator 30 may then be supplied via line 44 to the foam applicator 12 within the TDA where it can be applied onto a textile material for the purpose of dyeing. Subsequent exposure of the textile material will therefore allow e.g., the PRI dye molecule to oxidize to an indigo dye molecule thereby reliably fixing the dye to the textile material.

Accompanying FIG. 2 provides an alternative embodiments of the system 10 described above. In this regard, it will be observed that the system 10-1 of FIG. 2 is a continuous system whereby a water supply is controllably metered to an in-line mixer 50 (either static or dynamic) via line 42-1 along with dye chemical components from tanks 34a-34e via lines 42-2 through 42-6, respectively, by means of the peristaltic tube pump system 40. The dye mixture is discharged from the in-line mixer 50 via line 52 to a de-oxygenator tank 54. The deoxygenator tank 54 may be similar to the water deoxygenator 22 described previously. That is, the deoxygenator tank 54 may be any system that is conventionally known to deoxygenate a liquid, for example a conventional inert gas bubbler deoxygenator as shown or a conventional membrane contactor. Regardless of the system employed to deoxygenate the liquid chemical mixture, the deoxygenator tank 54 will provide a deoxygenated liquid chemical mixture having an oxygen content of about 5 ppm or less, e.g., between about 2 to about 5 ppm. Ideally, the deoxygenator tank 54 functions to deoxygenate the liquid chemical mixture therewithin to a level of entrained oxygen which is no greater than the inert gas discharged from the gas purifier 20, for example about 1 ppb or less.

Those in this art will appreciate that, although foamed dye materials have been described, the embodiments herein could also be employed to deliver non-foamed dye materials to the TDA system. That is, the foam generator 30 could be replaced with a storage tank maintained under a blanket of deoxygenated inert gas from the gas purifier 20 to contain a source of deoxygenated dye material that could then be transferred to a spray system within the TDA to be sprayed onto a textile product. According to this alternative system, the foam applicator 12 within the TDA would be replaced by a spray applicator system.

These and other attributes and advantages of the invention will become more clear after consideration of the following non-limiting Example.

C. EXAMPLES

The following test methodologies were employed:
Deoxygenation
A liquid was considered to be "deoxygenated" when there is no change of color of a dilute solution of indigo dye contained in the liquid. The presence of oxygen in a liquid containing indigo dye would be visible apparent by a color change of the liquid to red.
Foam Stability
Foam stability was determined using a "Kitchen Aid" test by subjecting 300 grams of liquid formula to be tested that includes the foaming surface to foam creation by operation of a Kitchen Aid Wire Whip Mixer on a high power setting for 3 minutes. A timer was restarted when the Mixer was turned off, following which the bowl containing the foamed formula was covered with SARAN® plastic wrap. A pin hole was formed in the plastic wrap and liquid created by collapsed foam was poured through the pin hole. The elapsed time between the mixer being turned off and when 150 grams of the liquid is collected was noted as the "half life" of the foam. A longer "half life" is therefore indicative of a more stable foam.

Wetting Test

Wetting is determined using the Draves Wetting Test (ASTM D2281-68). The Draves Wetting Test is a commonly used practical test for textile wettability in which a 5 g skein of gray naturally waxed cotton yarn (54 in loops containing 120 threads) is attached to a 3 g hook and totally immersed in a tall cylinder of surfactant solution by means of weight tied to the hook by a thread. The surfactant solution displaces the air in the skein by a spreading wetting process, and when sufficient air has been displaced, the skin suddenly sinks into the cylinder. The better the wetting agent, the shorter the time required for sinking to occur. Rapid wetting is generally defined to be <40 seconds.

Examples 1-5

The formulations as identified in Table 1 below were subjected to foam stability testing using the Kitchen Aid test described above.

TABLE 1

|  | Example 1 | Example 2 | Example 3 | Example 4 | Example 5 |
|---|---|---|---|---|---|
| Unifroth ™ 1672 (100%) | 3 wt % | 3 wt % | 3 wt % | 3 wt % | 3 wt % |
| Uniwet ™ 2413 (80%) | 2.6 wt % | 2.6 wt % | 2.6 wt % | | |
| Thickener 2515 (9%) | 0.5 wt % | 2 wt % | 10 wt % | | |
| Caustic (50%) | 1.7 wt % | 1.7 wt % | 1.7 wt % | 10 wt % | 20 wt % |
| Water | balance | balance | balance | balance | balance |
| Kitchen Aid Foam Half Life (minutes) | 6.5 | 6.5 | 13 | 4 | 7 |

The data of Examples 1-3 clearly show an increase in foam stability with the use of a thickener. It is believed that the thickener increases the viscosity of the interstitial water leading to slower drainage and thus improved stability.

The data of Examples 4 and 5 show that increased pH through the use of increased caustic also increases foam stability.

Examples 6-8

The formulations as identified in Table 1 below were subjected to foam stability testing using the Kitchen Aid test described above.

TABLE 2

|  | Example 6 | Example 7 | Example 8 |
|---|---|---|---|
| Foaming Agent: Unifroth ™ 1672 (100 wt %) | 3 wt % | 3 wt % | 3 wt % |
| Wetting Agent: Glucopon ™ 420 UP (50 wt %) (Caprylyl Glucoside and Myristyl Glucoside) | | 2.6 wt % | |
| Wetting Agent: Glucopon ™ 215 UP (65 wt %) (Caprylyl Glucoside and Decyl Glucoside) | | | 2 wt % |
| UniwetT ™ 2413 (80 wt %) | 2.6 wt % | | |
| Water | balance | balance | balance |
| Kitchen Aid Foam Half Life (minutes) | 5 | 9 | 11 |

The data of Examples 6 to 8 show that replacing Uniwet™ 2413 with both Glucoside™ 420 and Glucoside™ 215 increases foam stability. It is believed that this result is due to the improved wetting characteristic as measured by the Draves wetting time. Due to the shorter chain length, it is expected that Glucopon™ 215 UP will have a shorter Draves wetting time than Glucopon™ 420 UP.

Example 9

Textile products were dyed in a using deoxygenated PRI dye formulations which included an indigo dye combined with the chemical mixtures according to Examples 6-8 above. Comparative indigo dye formulations using indigo dye and chemical mixtures similar to Examples 6-8 were also prepared which did not include the wetting agent and used to dye textile products. The textile products were dyed using the system described in US 2018/073192. The resulting dyed textile products using the dye formulations of Examples 6-8 exhibited even shades and even dyeing. However, the textile products dyed with the comparative examples exhibited uneven shades and unevenness of dyeing. The results of this example indicate a need for a wetting agent to be present in the deoxygenated foamed PRI dye formulation as most natural yarns have waxes and pectins that lead to water repellency. The use of a wetting agent will help improve even absorption onto the yarn. Additionally, the use of a wetting agent would also assist in controlling dye penetration into the yarn.

Example 10

A formulation similar to Example 6 was made but with 1 wt. % Atesan™ LPW (alcohol ethoxylate sulfonate) wetting agent instead of the 2 wt. % Uniwet™ 2413 wetting agent. Comparable results were achieved at much lower level of wetting agents indicating improved wetting capabilities.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A method of making a deoxygenated liquid dye material comprising the steps of:
   (a) supplying a deoxygenated inert gas to a liquid dye material that is susceptible to oxidation by the steps of:
      (a1) providing a supply of inert gas; and
      (a2) passing the inert gas for the supply thereof to a gas purifier to reduce oxygen content in the inert gas to 500 ppb oxygen or less; and thereafter
   (b) mixing the liquid dye material in the presence of the supplied deoxygenated inert gas with water and at least one dye formulation component selected from the group consisting of reducing agents, pH adjusters, foaming agents, wetting agents and auxiliary chemicals to form a deoxygenated aqueous dye composition having an oxygen content of 30 ppm oxygen or less.

2. The method according to claim 1, wherein the deoxygenated aqueous dye composition formed according to step (b) has an oxygen content of 1 ppm or less.

3. The method according to claim 1, which further comprises supplying deoxygenated water to the liquid dye material in the presence of the supplied deoxygenated inert gas.

4. The method according to claim 3, which comprises supplying the deoxygenated inert gas to a water deoxygenator and deoxygenating water in the water deoxygenator with the supplied inert gas.

5. The method according to claim 3, which comprises providing the deoxygenated water by passing water through a deoxygenation membrane.

6. The method according to claim 1, which comprises providing at least one container to contain the at least one dye formulation component, and supplying the deoxygenated inert gas to the at least one container to maintain the at least one dye formulation component in a substantially oxygen-free environment.

7. A method of making a deoxygenated liquid dye material comprising the steps of:
   (a) supplying a deoxygenated inert gas to a liquid dye material that is susceptible to oxidation;
   (b) supplying a metered amount of at least one dye formulation component to be mixed with the liquid dye material by a peristaltic pump; and
   (c) mixing the liquid dye material in the presence of the supplied deoxygenated inert gas with water and the at least one dye formulation component selected from the group consisting of reducing agents, pH adjusters, foaming agents, wetting agents and auxiliary chemicals to form a deoxygenated aqueous dye composition having an oxygen content of 30 ppm oxygen or less.

8. The method according to claim 7, wherein
step (b) comprises supplying an output of the peristaltic pump to a mixing tank, and wherein
step (c) comprises mixing the at least one dye formulation component with the liquid dye material in the mixing tank to form the deoxygenated aqueous dye composition.

9. The method according to claim 8, wherein the deoxygenated aqueous dye composition is supplied to a foam generator for generating a deoxygenated foamed aqueous dye composition.

10. The method according to claim 9, further comprising applying the deoxygenated foamed aqueous dye composition onto a textile product.

11. The method according to claim 7, which comprises providing at least one container to contain the at least one dye formulation component, and supplying the deoxygenated inert gas to the at least one container to maintain the at least one dye formulation component in a substantially oxygen-free environment.

12. The method according to claim 7, wherein step (c) further comprises the steps of:
   (c1) supplying an output of the peristaltic pump to an in-line mixing tank and mixing the at least one dye formulation component with the liquid dye material in the in-line mixer; and
   (c2) discharging a liquid mixture of the at least one dye formulation component with the liquid dye material in the in-line mixer to a deoxygenator and deoxygenating the mixture to form the deoxygenated aqueous dye composition.

13. The method according to claim 12, wherein the deoxygenated aqueous dye composition is supplied to a foam generator for generating a deoxygenated foamed aqueous dye composition.

14. The method according to claim 12, wherein the deoxygenated aqueous dye composition is supplied to a sprayer for generating a spray of the deoxygenated aqueous dye composition.

15. The method according to claim 12, which comprises supplying the deoxygenated inert gas to a deoxygenator tank containing the mixture of the at least one dye formulation component with the liquid dye material, and deoxygenating the mixture in the deoxygenator tank with the supplied inert gas.

16. The method according to claim 12, which comprises passing the mixture of the at least one dye formulation component with the liquid dye material through a deoxygenation membrane to form the deoxygenated aqueous dye composition.

17. A system for making a deoxygenated liquid dye material comprising:
   a source of deoxygenated inert gas, wherein the source of deoxygenated inert gas comprises an inert gas purifier to reduce oxygen content in the inert gas to 500 ppb oxygen or less;
   a source of liquid dye material that is susceptible to oxidation fluid connected to the source of deoxygenated inert gas; and
   a mixer fluid-connected to the source of deoxygenated inert gas for mixing the liquid dye material in the presence of the deoxygenated inert gas with water and at least one dye formulation component selected from the group consisting of reducing agents, pH adjusters, foaming agents, wetting agents and auxiliary chemicals to form a deoxygenated aqueous dye composition having an oxygen content of 30 ppm or less.

18. The system according to claim 17, further comprising a peristaltic pump for supplying a metered amount of at least one dye formulation component to be mixed with the liquid dye material.

19. The system according to claim 17, which further comprises a source of deoxygenated water and a line supplying the deoxygenated water to the liquid dye material in the mixer.

20. The system according to claim 19, which wherein the source of deoxygenated water comprises a water deoxygenator in fluid communication with the deoxygenated inert gas for deoxygenating water in the water deoxygenator with the supplied inert gas.

21. The system according to claim 19, wherein the source of deoxygenated water comprises a deoxygenation membrane.

22. The system according to claim 17, which further comprises at least one container to contain the at least one dye formulation component, wherein the at least one container is in fluid communication with the deoxygenated inert gas to maintain the at least one dye formulation component in a substantially oxygen-free environment.

23. A system for making a deoxygenated liquid dye material comprising:
   a source of deoxygenated inert gas;
   a source of liquid dye material that is susceptible to oxidation fluid connected to the source of deoxygenated inert gas;
   a peristaltic pump for supplying a metered amount of at least one dye formulation component to be mixed with the liquid dye material; and
   a mixer fluid-connected to the source of deoxygenated inert gas for mixing the liquid dye material in the presence of the deoxygenated inert gas with water and at least one dye formulation component selected from the group consisting of reducing agents, pH adjusters, foaming agents, wetting agents and auxiliary chemicals to form a deoxygenated aqueous dye composition having an oxygen content of 30 ppm or less.

24. The system according to claim 23, further comprising a mixing tank for receiving an output of the peristaltic pump, wherein the at least one dye formulation component is mixed in the mixing tank with the liquid dye material to form the deoxygenated aqueous dye composition.

25. The system according to claim 24, further comprising a foam generator for receiving the deoxygenated aqueous dye composition from the mixing tank and generating a deoxygenated foamed aqueous dye composition.

26. The system according to claim 25, further comprising a foam applicator for applying the deoxygenated foamed aqueous dye composition onto a textile product.

27. The system according to claim 23, which comprises at least one container to contain the at least one dye formulation component in fluid communication with the deoxygenated inert gas to maintain the at least one dye formulation component in a substantially oxygen-free environment.

28. The system according to claim 23, further comprising:
   an in-line mixer for receiving an output of the peristaltic pump and forming a liquid mixture of the at least one dye formulation component with the liquid dye material therein to form a liquid mixture; and
   a deoxygenator for receiving the liquid mixture from the in-line mixer and deoxygenating the liquid mixture to form the deoxygenated aqueous dye composition.

29. The system according to claim 28, further comprising a foam generator for receiving the deoxygenated aqueous dye composition from the deoxygenator and generating a deoxygenated foamed aqueous dye composition.

30. The system according to claim 28, wherein the deoxygenator comprises a deoxygenator tank which is fluid connected to the source of deoxygenated inert gas to deoxygenate the liquid mixture with the supplied deoxygenated inert gas.

31. The system according to claim 28, wherein the deoxygenator comprises a deoxygenation membrane for deoxygenating the mixture of the at least one dye formulation component with the liquid dye material.

* * * * *